US012767135B2

(12) United States Patent
Varnhagen

(10) Patent No.: US 12,767,135 B2
(45) Date of Patent: Oct. 20, 2026

(54) VEHICLE CONTROL

(71) Applicant: Ford Global Technologies, LLC, Dearborn, MI (US)

(72) Inventor: Scott Julian Varnhagen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 18/741,927

(22) Filed: Jun. 13, 2024

(65) Prior Publication Data

US 2025/0381959 A1 Dec. 18, 2025

(51) Int. Cl.
*B60W 30/18* (2012.01)
*B60W 50/00* (2006.01)

(52) U.S. Cl.
CPC ............ *B60W 30/18* (2013.01); *B60W 50/00* (2013.01); *B60W 2556/45* (2020.02)

(58) Field of Classification Search
CPC ... B60W 30/18; B60W 50/00; B60W 2556/45
See application file for complete search history.

(56) References Cited

U.S. PATENT DOCUMENTS

| | | | | |
|---|---|---|---|---|
| 11,243,532 | B1 * | 2/2022 | Levihn | G05D 1/0291 |
| 11,567,492 | B2 * | 1/2023 | Whitney | B60Q 1/2611 |
| 11,755,469 | B2 | 9/2023 | Atmeh | |
| 11,827,240 | B2 | 11/2023 | Subramanian et al. | |
| 11,884,304 | B2 | 1/2024 | Sredzki et al. | |
| 2019/0391580 | A1 * | 12/2019 | Di Cairano | G08G 1/165 |
| 2021/0103283 | A1 * | 4/2021 | Liu | B60W 60/001 |
| 2021/0253128 | A1 | 8/2021 | Nister et al. | |
| 2024/0067209 | A1 | 2/2024 | Bardos et al. | |

* cited by examiner

*Primary Examiner* — David P. Merlino
*Assistant Examiner* — Mahmoud M Kazimi
(74) *Attorney, Agent, or Firm* — Frank A. MacKenzie; Brooks Kushman P.C.

(57) ABSTRACT

Based on respective maneuvers, respective trajectories are generated according to respective vehicle states. Respective motion control operations of a vehicle driving system are performed along the respective trajectories. For each of the motion control operations along the respective trajectories, it is determined whether output of the vehicle driving system is within a difference parameter. The difference parameter specifies a permitted deviation from one of the respective vehicle states included in the respective trajectories.

17 Claims, 5 Drawing Sheets

VEHICLE CONTROL

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be accounted for in the vehicle's environment.

DETAILED DESCRIPTION

Figure 1:
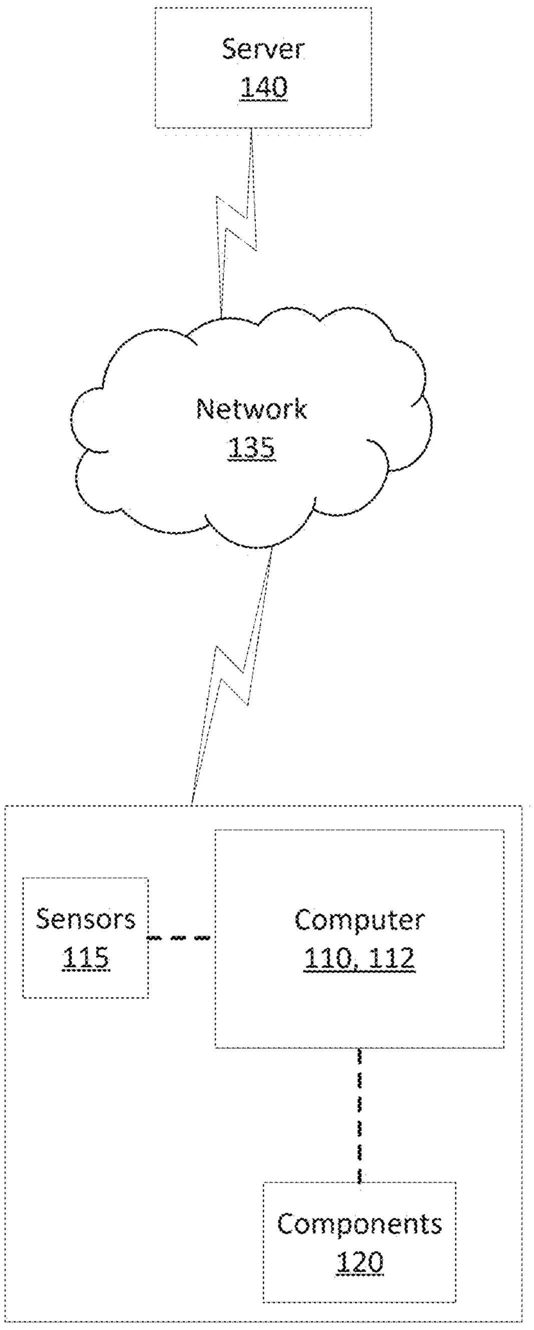
FIG. 1 is a block diagram illustrating an example simulation system to perform motion control operations and motion planning operations.

A vehicle can include a driving system that may control various vehicle components and/or operations without input from a human operator. For example, the driving system may perform perception, motion planning, and motion control operations to operate the vehicle in an environment around the vehicle. Perception operation may obtain information about the vehicle, its surrounding environment, and objects therein based on vehicle sensor data. For example, the perception operation may collect sensor data concerning a speed of the vehicle, an acceleration of the vehicle, a steering wheel torque from a steering system of the vehicle, etc. The motion planning operation is a process by which a trajectory is determined to operate a vehicle within an environment. The motion planning operation can take as input the sensor data obtained by the perception operations. The motion planning operation may plan a trajectory for the vehicle based on the sensor data. The motion control operation is a process by which the vehicle is operated to move according to the planned trajectory. The motion control operation can take the trajectory as its input. The motion control operation can actuate various vehicle components to operate the vehicle along the trajectory. Typically, vehicle operation includes closed-loop planning that provides feedback from the motion control operation to the motion planning operation, which can increase computational resources and an amount of time to identify whether motion control operation and motion planning operation are operating within respective specifications.

A system includes a computer including a processor and a memory, the memory storing instructions executable by the processor to, based on respective maneuvers, generate respective trajectories according to respective vehicle states. The instructions further include instructions to perform respective motion control operations of a vehicle driving system along the respective trajectories. The instructions further include instructions to determine, for each of the motion control operations along the respective trajectories, whether output of the motion control operations is within a difference parameter. The difference parameter specifies a permitted deviation from one of the respective vehicle states included in the respective trajectory.

The instructions can further include instructions to perform respective motion planning operations of the vehicle driving system based on respective scenarios. The scenario specifies objects in an environment and points through which vehicle operation is planned. The instructions can further include instructions to determine, for each of the motion planning operations, whether output of the motion planning operations is a generated trajectory according to the respective vehicle states.

The instructions can further include instructions to determine, for each of the motion planning operations, whether the generated trajectories exceeds a trajectory constraint based on the difference parameter.

The instructions can further include instructions to, upon determining, for each of the motion planning operations, that the output of the motion planning operations is the generated trajectory according to the respective vehicle states and the generated trajectories do not exceed the trajectory constraint, provide the motion planning operations to a vehicle computer. The system can further include the vehicle computer. The vehicle computer can include a second processor and a second memory storing instructions executable by the second processor such that the vehicle computer is programmed to, while the output of the motion planning operations is the generated trajectory according to the respective vehicle states and the generated trajectories do not exceed the trajectory constraint, operate a vehicle based on the motion planning operations.

The instructions can further include instructions to, upon determining, for each of the motion control operations along the respective trajectories, that the output of the motion control operations is within the difference parameter, provide the motion control operations to a vehicle computer. The system can further include the vehicle computer. The vehicle computer can include a second processor and a second memory storing instructions executable by the second processor such that the vehicle computer is programmed to, while the output of the motion control operations is within the difference parameter, operate a vehicle based on the motion control operations.

A system includes a first computer including a processor and a memory, the memory storing instructions executable by the processor such that the first computer is programmed to, based on respective maneuvers, generate respective trajectories according to respective vehicle states. The first computer is further programmed to perform respective motion control operations of a vehicle driving system along the respective trajectories. The first computer is further programmed to determine, for each of the motion control operations along the respective trajectories, whether output of the motion control operations is within a difference parameter. The difference parameter specifies a permitted deviation from one of the respective vehicle states included in the respective trajectory.

The system can further include a second computer including a second processor and a second memory storing instructions executable by the second processor such that the second computer is programmed to perform respective motion planning operations of the vehicle driving system based on respective scenarios. The scenario specifies objects in an environment and points through which vehicle operation is planned. The second computer can be further programmed to determine, for each of the motion planning operations, whether output of the motion planning operations is a generated trajectory according to the respective vehicle states.

The second computer can be further programmed to determine, for each of the motion planning operations, whether the generated trajectories exceeds a trajectory constraint based on the difference parameter.

The second computer can be further programmed to, upon determining, for each of the motion planning operations, that the output of the motion planning operations is the generated trajectory according to the respective vehicle states and the generated trajectories do not exceed the trajectory constraint, provide the motion planning operations to a vehicle computer. The system can further include the vehicle computer. The vehicle computer can include a third processor and a third memory storing instructions executable by the third processor such that the vehicle computer is programmed to, while the output of the motion planning operations is the generated trajectory according to the respective vehicle states and the generated trajectories do not exceed the trajectory constraint, operate a vehicle based on the motion planning operations.

The first computer can be further programmed to, upon determining, for each of the motion control operations along the respective trajectories, that the output of the motion control operations is within the difference parameter, provide the motion control operations to a vehicle computer. The system can further include the vehicle computer. The vehicle computer can include a third processor and a third memory storing instructions executable by the third processor such that the vehicle computer is programmed to, while the output of the motion control operations is within the difference parameter, operate a vehicle based on the motion control operations.

A method includes, based on respective maneuvers, generating respective trajectories according to respective vehicle states. The method further includes performing respective motion control operations of a vehicle driving system along the respective trajectories. The method further includes determining, for each of the motion control operations along the respective trajectories, whether output of the motion control operations is within a difference parameter. The difference parameter specifies a permitted deviation from one of the respective vehicle states included in the respective trajectory.

The method can further include performing respective motion planning operations of the vehicle driving system based on respective scenarios. The scenario specifies objects in an environment and points through which vehicle operation is planned. The method can further include determining, for each of the motion planning operations, whether output of the motion planning operations is a generated trajectory according to the respective vehicle states.

The method can further include determining, for each of the motion planning operations, whether the generated trajectories exceeds a trajectory constraint based on the difference parameter. The method can further include, upon determining, for each of the motion planning operations, that the output of the motion planning operations is the generated trajectory according to the respective vehicle states and the generated trajectories do not exceed the trajectory constraint, providing the motion planning operations to a remote computer.

The method can further include, upon determining, for each of the motion control operations along the respective trajectories, that the output of the motion control operations is within the difference parameter, provide the motion control operations to a remote computer. The method can further include, while the output of the motion control operations is within the difference parameter, operating, via the remote computer, a vehicle based on the motion control operations.

Further disclosed herein is a computing device programmed to execute any of the above method steps. Yet further disclosed herein is a computer program product, including a computer readable medium storing instructions executable by a computer processor, to execute an of the above method steps.

As disclosed herein, utilizing open-loop planning in vehicle operations can decouple motion planning operations from motion control operations by not requiring feedback from motion control operations to be input into motion planning operations. Decoupling motion planning operation from motion control operation allows for performing motion control operation and motion planning operation independently of each other, which can reduce computational resources and an amount of time required to determine whether motion control operation and motion planning operation are operating within respective specifications.

With reference to FIG. 1, an example simulation system 100 includes a computer 110. The simulation system 100 can simulate operating conditions of a vehicle. The computer 110 is programmed to, based on respective maneuvers, generate respective trajectories according to respective vehicle states. The computer 110 is further programmed to perform respective motion control operations of a vehicle driving system along the respective trajectories. The computer 110 is further programmed to determine, for each of the motion control operations along the respective trajectory, whether output of the motion control operations is within a difference parameter. The difference parameter specifies a permitted deviation from one of the respective vehicle states included in the respective trajectory.

The simulation system 100 may include hardware and software such as is known (or could be a system developed or built in the future). The simulation system 100 may include the computer 110, sensors 115, and vehicle components 120 comprising a vehicle subsystem, e.g., the powertrain subsystem, the braking subsystem, the steering subsystem, etc. As discussed further below, the simulation system 100 can simulate operation of a virtual vehicle and/or physical vehicle components. The computer 110 is generally arranged for communications on a communication network that can include a controller area network (CAN) or the like, and/or other wired and/or wireless mechanisms. Via the communication network, the computer 110 may receive messages (e.g., CAN messages) from the various devices (e.g., sensors 115) in the simulation system 100. For example, the sensors 115 may provide the computer 110 with data about the components 120 being used for simulation. As mentioned below, various controllers and/or sensors 115 may provide data to the computer 110 via the communication network. Additionally, the computer 110 may transmit messages to a remote server computer 140 (e.g., via a network 135 as discussed below).

The computer 110 can collect and process data about the vehicle components 120 being used for simulation. Based on the data, the computer 110 can actuate the vehicle components 120 during the simulation. For example, the vehicle subsystem being simulated can be the powertrain subsystem, a brake subsystem, a steering subsystem, etc. In these circumstances, the computer 110 can be a powertrain controller, a brake controller, a steering controller, etc. The computer 110 can control operation of the vehicle components 120 of the vehicle subsystem being simulated. For example, the operation can be controlling steering, controlling braking, controlling a human-machine interface, etc. The computer 110 may be an electronic control unit (ECU). An "electronic control unit" (ECU) is a device including a processor and a memory that includes programming (i.e., the memory stores instructions executable by the processor) to control one or more vehicle components 120.

A first computer 110 may be installed in the simulation system 100 to simulate motion control operations of the vehicle driving system. Following the motion control operations simulation, the first computer 110 may be replaced with a second computer 112 (e.g., to simulate motion planning operations of the vehicle driving system). As another example, the first computer 110 may remain in the simulation system 100 following the motion control operations simulation (e.g., to simulate motion planning operations of the vehicle driving system). As another example, the system 100 can include the second computer 112 installed in a second simulation system 100 such that the motion control operations and the motion planning operations simulations can be performed simultaneously.

Sensors 115 can include a variety of devices. For example, various controllers in a simulation system 100 may operate as sensors 115 to provide data via wired communication, e.g., data relating to subsystem and/or component status, to the computer 110. Further, other sensors 115 could include cameras, motion detectors, etc., i.e., sensors 115 to provide data for evaluating a position of a component, a condition of a component, etc. The sensors 115 could, without limitation, also include radar, LIDAR, and/or ultrasonic transducers.

The simulation system 100 can simulate one or more actual (i.e., physical) vehicle components 120. For example, the simulation system 100 can include each vehicle component 120 of a vehicle powertrain subsystem and a steering subsystem. As another example, the simulation system 100 can include vehicle components 120 constituting a portion of one or more vehicle subsystems. In this context, each vehicle component 120 includes one or more hardware components adapted to perform a mechanical function or operation-such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, or the like.

As another example, the simulation system 100 can simulates a virtual vehicle. In such an example, the first computer 110 can input a virtual vehicle into a vehicle dynamics model. The "vehicle dynamics model" is a physics-based kinematic or dynamic model describing vehicle motion that outputs respective vehicle states according to various control parameters (e.g., steering wheel torque, longitudinal acceleration, etc.). The vehicle dynamics model can model and output performance of the virtual vehicle (or one or more components thereof) actuated to move along the various trajectories. By inputting the virtual vehicle to the vehicle dynamics model, the first computer 110 can obtain data specifying respective vehicle states while operating the virtual vehicle along various trajectories. That is, the first computer 110 can simulate motion control operations of the virtual vehicle along various trajectories. In this situation, the first computer 110 can determine whether output of the vehicle driving system is within a control parameter.

The network 135 represents one or more mechanisms by which the computer 110 may communicate with remote computing devices (e.g., the remote server computer 140, a mobile device, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device (i.e., including one or more processors and one or more memories) programmed to provide operations such as disclosed herein. Further, the remote server computer 140 can be accessed via the network 135 (e.g., the Internet, a cellular network, and/or or some other wide area network).

The first computer 110 is programmed to verify motion control operations of a vehicle driving system. A vehicle driving system may control various vehicle components and/or operations without input from a human operator. To verify the motion control operations of the vehicle driving system, the first computer 110 selects a maneuver from a plurality of maneuvers. Verifying the motion control operations means determining that output of the motion control operations is within the respective difference parameters during operation along respective trajectories. As used herein, a "maneuver" defines, relative to a global coordinate system, a trajectory extending through waypoints. As used herein, a "trajectory" specifies a planned path for a vehicle and a set of expected vehicle states (including vehicle speed) describing motion of the vehicle along the path. As used herein, a "path" is a set of waypoints (e.g., that can be specified as coordinates with respect to a vehicle coordinate system and/or geo-coordinates) that the computer 110 is programmed to determine with a conventional navigation and/or path planning algorithm. A path can be specified according to one or more path polynomials or other primitives.

The first computer 110 can, for example, access a database, or the like, that stores the plurality of maneuvers to select the respective maneuvers. The database may further indicate whether motion control operations have been simulated for each of the maneuvers. The first computer 110 can be programmed to iteratively select the maneuvers in the database until motion control operations are simulated for each maneuver. The maneuvers are constrained by respective vehicle states. Constraining the trajectory by respective vehicle states means that, along the trajectory, the respective vehicle states achieve respective values within respective state constraints within predetermined numbers of time periods, which permits the vehicle to achieve the trajectory without exceeding limits of vehicle operation. As used herein, a "vehicle state" is a physical measurement of a vehicle (e.g., vehicle speed, acceleration, steering angle, lateral offset, yaw rate, yaw acceleration, a position, etc.).

A state constraint specifies a range of maximum and minimum values, inclusive, for the respective vehicle states according to which a vehicle can be operated along a given path. Thus, a state constraint herein means a pair of values (i.e., a minimum and maximum value). The respective ranges may be determined empirically (e.g., based on testing and/or simulation to determine various values of the respective vehicle states that achieve vehicle operation along various paths in accordance with vehicle design and/or component parameters).

Upon selecting the maneuver, the first computer 110 can transform the trajectory of the maneuver from the global coordinate system to a vehicle coordinate system (e.g., according to known coordinate system transformation techniques). The first computer 110 can then generate a trajectory based on the transformed trajectory.

The first computer 110 is programmed to perform motion control operations along the trajectory. A motion control operation is programming of the vehicle driving system for following the trajectory to achieve the maneuver. The motion control operations can be stored (e.g., in a memory of the first computer 110). The motion control operations determine control parameters of the vehicle that, if met, would move the vehicle along the trajectory. For example, the motion control operations can determine a longitudinal acceleration, a longitudinal torque, a steering torque, a steering wheel angle, etc.

The motion control operations can determine the control parameters of the vehicle with a state observer algorithm. A "motion control algorithm" is a control algorithm that outputs one or more control parameters based on inputs of one or more vehicle states. For example, the respective expected vehicle states for the trajectory can be input to the motion control algorithm. The motion control algorithm can then output control parameters for the vehicle to operate along the trajectory. The motion control algorithm can be, e.g., a model predictive control algorithm, a linear-quadratic regulator algorithm, a full state feedback control algorithm, a partial state feedback control algorithm, or a pole placement algorithm.

The first computer 110 can then determine whether output from the vehicle driving system is within a difference parameter of the respective vehicle state. That is, the first computer 110 can determine whether the motion control operations can operate a vehicle within the difference parameter to achieve the maneuver. As one example, the first computer 110 can actuate one or more actual (i.e., physical) vehicle components 120 (as discussed above) based on the output control parameters to operate the vehicle along the trajectory. In such an example, the first computer 110 can determine respective output vehicle states as the vehicle operates along the trajectory based on sensor 115 data of the vehicle components 120. As another example, the first computer 110 can input the control parameters into the vehicle dynamics model (as discussed above), which can output the respective output vehicle states as a virtual vehicle operates along the trajectory.

The first computer 110 can then compare the respective output vehicle states with the respective expected vehicle states specified by the portion of the transformed trajectory corresponding to the trajectory. The first computer 110 can verify the motion control operations for the maneuver based on the respective output vehicle states being within respective difference parameters of the respective expected vehicle states along each of a plurality of respective trajectories. A difference parameter specifies permitted deviation from one of the respective vehicle states during motion control operations. The respective difference parameters may be stored (e.g., in a memory of the first computer 110). The respective difference parameters may be determined empirically (e.g., based on testing and/or simulation to determine maximum permitted deviation from various vehicle states at which a vehicle can be operated along a planned path to navigate an environment). As another example, the respective difference parameters may be specified so as to satisfy permitted deviation for the vehicle driving system (e.g., including perception operations, motion control operations, and motion planning operations).

Prior to the vehicle (or the virtual vehicle) reaching a terminal point of the transformed trajectory, the first computer 110 can periodically generate updated trajectories update as the motion control operations move the vehicle (or virtual vehicle) along the transformed trajectory. The first computer 110 can then concatenate the updated trajectory to a previous trajectory to achieve the transformed trajectory.

The first computer 110 can verify the motion control operations for each of the trajectories along the transformed trajectory in this manner. If each of the respective output vehicle states is within the respective difference parameters of the respective expected vehicle states for each of the respective trajectories, then the first computer 110 can determine that the motion control operations of the vehicle driving system are verified for the selected maneuver. If at least one of the respective output vehicle states is outside of the respective difference parameter from the at least one of the respective expected vehicle states for at least one respective trajectory, then the first computer 110 can determine that the motion control operations of the vehicle driving system are unverified for the maneuver. Upon determining whether the motion control operations are verified for each of the respective trajectories, the first computer 110 can update the database to indicate that the selected maneuver has been simulated.

The first computer 110 can verify the motion control operations for each of the plurality of maneuvers in this manner. If the motion control operations for each of the maneuvers are verified, then the first computer 110 determines that the motion control operations of the vehicle driving system are verified. In this situation, the first computer 110 may provide a message (e.g., via the network 135) to the remote server computer 140/or the vehicle computer 210 indicating that the motion control operations of the vehicle driving system are verified. Additionally, or alternatively, the first computer 110 may provide the motion control operations to the remote server computer 140/or the vehicle computer 210 (e.g., via the network 135). If at least one of the maneuvers is unverified, then the first computer 110 determines that the motion control operations of the vehicle driving system are unverified. In this situation, the first computer 110 may provide a message (e.g., via the network 135) to the remote server computer 140/or the vehicle computer 210 indicating that the motion control operations of the vehicle driving system are unverified. Additionally, the message may specify the maneuver(s) in which the motion control operations are unverified.

The first computer 110 may be further programmed to verify motion planning operations of the vehicle driving system. In such an example, the first computer 110 can verify the motion planning operations of the vehicle driving system independently of the motion control operations of the vehicle driving system. For example, the first computer 110 can verify the motion planning operations of the vehicle driving system before or after verifying the motion control operations of the vehicle driving system. Alternatively, a second computer 112 may be programmed to verify motion planning operations of the vehicle driving system. In such an example, the second computer 112 may verify the motion planning operations simultaneously to the first computer 110 verifying the motion control operations of the vehicle driving system.

To verify the motion planning operations of the vehicle driving system, the computer 110, 112 selects a scenario from a plurality of scenarios. A scenario is a set of location data provided relative to the global coordinate system. The location data describes respective locations of objects in an environment around the vehicle and a set of points through which vehicle operation is planned. The computer 110, 112 can select the scenario from a database, or the like, that stores various possible scenarios. The database may further indicate whether motion planning operations have been simulated for each of the scenarios. The computer 110, 112 can access the database (e.g., stored in a memory of the computer 110, 112) to iteratively or sequentially execute the scenarios until motion planning operations are simulated for each scenario.

Each set of points in the respective scenarios includes an initial point and a terminal point specifying respective expected vehicle states. Each scenario may further include one or more trajectory constraints, including objects. A "trajectory constraint" is a limit on vehicle operation along a trajectory based on the scenario through which the trajectory passes (e.g., a minimum distance between the trajectory and an object adjacent to a portion of the trajectory, a specification limiting speed along a portion of the trajectory, etc.).

Upon selecting the scenario, the computer 110, 112 can input the scenario into a non-dynamic simulator. A "non-dynamic simulator" is a model that propagates the expected vehicle states along a trajectory extending through the set of points. The non-dynamic simulator can transform information in the scenario from the global coordinate system to the vehicle coordinate system (e.g., according to known coordinate system transformation techniques). That is, the non-dynamic simulator receives the scenarios as input and outputs a transformed scenario.

The computer 110, 112 can then perform motion planning operations to generate a trajectory for the transformed scenario. Motion planning operations are programming of the vehicle driving system that generates trajectories for a vehicle as the vehicle moves between the set of points within the scenario. The motion planning operations may be stored (e.g., in a memory of the computer 110, 112). The motion planning operations can be, e.g., a navigational algorithm that generates location coordinates for the vehicle over time. As an example, the motion planning operations can determine the path with a path polynomial. The path polynomial y(x) is a model that predicts the path as a line traced by a polynomial equation. The path polynomial y(x) predicts the path for a predetermined upcoming distance x, by determining a lateral coordinate y, e.g., measured in meters:

$$y(x) = a_0 + a_1x + a_2x^2 + a_3x^3 + \ldots + a_nx^n \quad (1)$$

The coefficients $a_n$ can represent one or more characteristics of the path, e.g., for a Nth degree path polynomial, $a_0$ an offset, i.e., a lateral distance between the path and a reference point of the vehicle at the upcoming distance x, $a_1$ through $a_n$ represent polynomial coefficients describing the path. In the present context, the "upcoming distance" x is a predetermined longitudinal distance in front of the vehicle from a reference point of the vehicle (e.g., a center point of the vehicle) at which the motion planning operations predict the path. The upcoming distance x can be determined empirically (e.g., based on testing and/or simulation to determine a minimum distance at which the motion planning operations can predict a path given available computational resources).

The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets.

The computer 110, 112 can determine whether the output of the motion planning operations is a valid trajectory (i.e., a generated trajectory according to the respective vehicle states) for the scenario. The trajectory output from the motion planning operations may, for example, include respective generated vehicle states at the respective points included in the transformed scenario. To determine whether the output is a valid trajectory, the computer 110, 112 can compare the respective generated vehicle states of the respective points to the respective state constraints. If at least one generated vehicle state of at least one respective point is outside of the respective state constraint, then the computer 110, 112 determines that the output is an invalid trajectory. If the respective generated vehicle states of each of the respective points are within the respective state constraints, then the computer 110, 112 determines that the output is a valid trajectory.

Additionally, the computer 110, 112 can determine whether the valid trajectory exceeds a trajectory constraint. To determine whether the valid trajectory exceeds the trajectory constraint, the computer 110, 112 can determine the respective points along the valid trajectory at which vehicle operation may be limited based on a presence of a trajectory constraint in the scenario. The computer 110, 112 can compare the respective generated vehicle states at the respective points to the trajectory constraint. If at least one of the respective generated vehicle states exceeds the trajectory constraint given the respective difference parameters of the respective vehicle states, then the computer 110, 112 determines that the valid trajectory exceeds the trajectory constraint. If each of the respective generated vehicle states do not exceed the trajectory constraint given the respective difference parameters of the respective vehicle states, then the computer 110, 112 determines that the valid trajectory does not exceed the trajectory constraint.

As another example, the computer 110, 112 can input a bias into the motion planning operations. The bias may be one of the pair of values defining the state constraint. As an example, the computer 110, 112 may input respective biases specifying each of the respective state constraints into respective motion planning operations. As another example, the bias may represent sources of noise in the selected scenario (e.g., due to variations in friction, object mass, road grade, etc.). In this situation, the motion planning operations outputs respective generated vehicle states of the respective points along the path based on the bias. The computer 110, 112 can then compare the respective generated vehicle states at the respective points to the trajectory constraint. If at least one of the respective generated vehicle states exceeds the trajectory constraint, then the computer 110, 112 determines that the valid trajectory exceeds the trajectory constraint. If each of the respective generated vehicle states do not exceed the trajectory constraint, then the computer 110, 112 determines that the valid trajectory does not exceed the trajectory constraint.

If the computer 110, 112 determines that the output of the motion planning operations for the scenario is a valid trajectory that does not exceed a trajectory constraint, then the computer 110, 112 determines that the motion planning operations for the scenario are verified. If the computer 110, 112 determines that the output of the motion planning operations for the scenario is an invalid trajectory or that a valid trajectory exceeds a trajectory constraint, then the computer 110, 112 determines that the motion planning operations for the scenario are unverified. Upon determining whether the output of the motion planning operations is verified, the computer 110, 112 can update the database to indicate that the selected scenario has been simulated.

The computer 110, 112 can verify the motion planning operations of the vehicle driving system for each scenario in this manner. If the motion planning operations for each scenario are verified, then the first computer 110 can determine that the motion planning operations of the vehicle driving system are verified. In this situation, the computer 110, 112 may provide a message (e.g., via the network 135) to the remote server computer 140 and/or the vehicle computer 210 indicating that the motion planning operations of the vehicle driving system are verified. Additionally, or alternatively, the computer 110, 112 may provide the motion planning operations to the remote server computer 140/or the vehicle computer 210 (e.g., via the network 135). If the motion planning operations for at least one scenario is unverified, then the computer 110, 112 determines that the motion planning operations of the vehicle driving system are unverified. In this situation, the computer 110, 112 may provide a message (e.g., via the network 135) to the remote server computer 140/or the vehicle computer 210 indicating that the motion planning operations of the vehicle driving system are unverified. Additionally, the message may specify the scenario(s) in which the motion planning operations are unverified.

The remote server computer 140 may be programmed to receive (e.g., from the first computer 110 and/or the second computer 112) the verified motion control operations. Upon receiving the verified motion control operations, the remote server computer 140 may store the verified motion control operations (e.g., in a memory of the remote server computer 140). The remote server computer 140 may be programmed to provide the verified motion control operations to a vehicle computer 210 in a vehicle 205 (e.g., via the network 135).

The remote server computer 140 may be programmed to receive (e.g., from the first computer 110 and/or the second computer 112) the verified motion planning operations. Upon receiving the verified motion planning operations, the remote server computer 140 may store the verified motion planning operations (e.g., in a memory of the remote server computer 140). The remote server computer 140 may be programmed to provide the verified motion planning operations to a vehicle computer 210 in a vehicle 205 (e.g., via the network 135).

Figure 2:
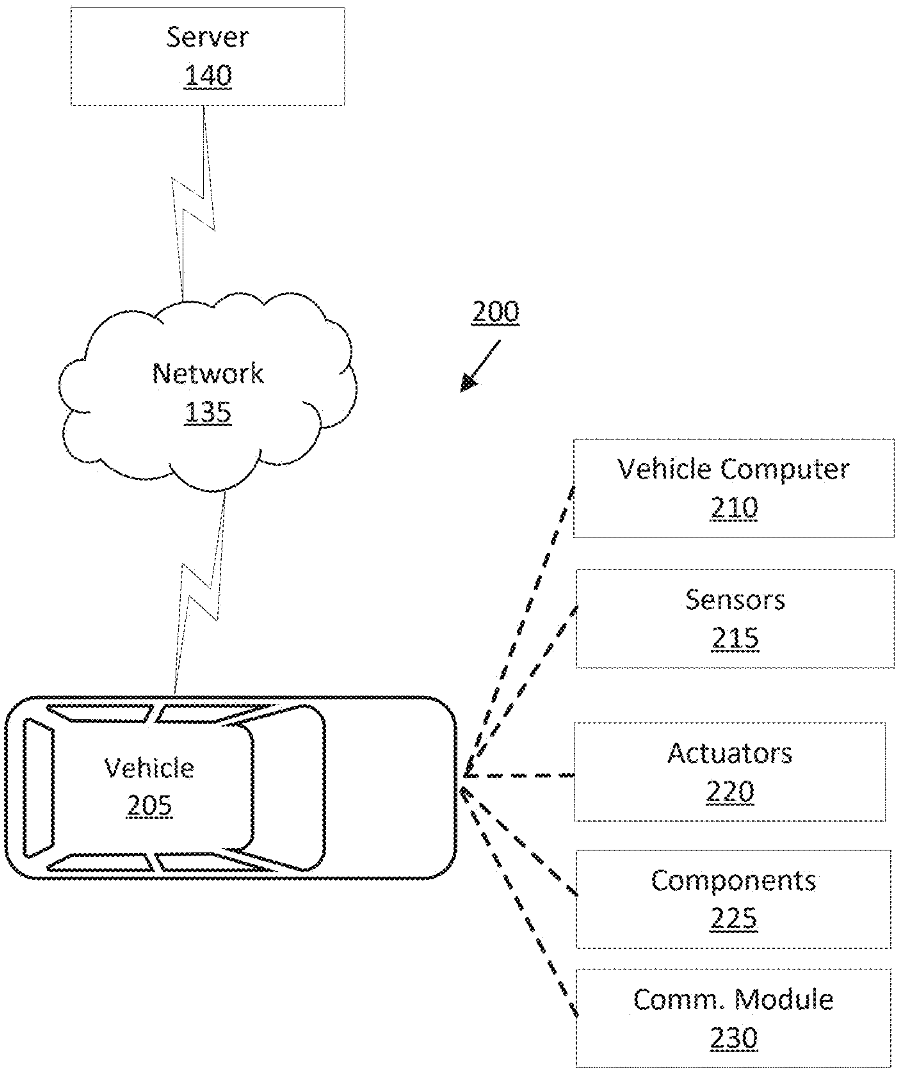
FIG. 2 is a block diagram illustrating an example vehicle control system.

Turning now to FIG. 2, an example vehicle control system 200 includes a vehicle 205. The vehicle 205 includes a vehicle computer 210, sensors 215, actuators 220 to actuate various vehicle components 225, and a vehicle communications module 230. The communications module 230 allows the vehicle computer 210 to communicate with the remote server computer 140, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via the packet network 135).

The vehicle computer 210 includes a processor and a memory such as are known. The memory includes one or more forms of computer-readable media, and stores instructions executable by the vehicle computer 210 for performing various operations, including as disclosed herein. The vehicle computer 210 can further include two or more computing devices operating in concert to carry out vehicle 205 operations including as described herein. Further, the vehicle computer 210 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 210 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 210.

The vehicle computer 210 may include programming to operate one or more of vehicle 205 propulsion, steering, transmission, climate control, interior and/or exterior lights, horn, doors, etc., as well as to determine whether and when the vehicle computer 210, as opposed to a human operator, is to control such operations.

The vehicle computer 210 may include or be communicatively coupled to (e.g., via a vehicle communications network such as a communications bus as described further below) more than one processor (e.g., included in electronic controller units (ECUs) or the like included in the vehicle 205) for monitoring and/or controlling various vehicle components 225 (e.g., a transmission controller, a steering controller, etc.). The vehicle computer 210 is generally arranged for communications on a vehicle communication network that can include a bus in the vehicle 205 such as a controller area network (CAN) or the like, and/or other wired and/or wireless mechanisms.

Via the vehicle 205 network, the vehicle computer 210 may transmit messages to various devices in the vehicle 205 and/or receive messages (e.g., CAN messages) from the various devices (e.g., sensors 215, an actuator 220, ECUs, etc.). Alternatively, or additionally, in cases where the vehicle computer 210 actually comprises a plurality of devices, the vehicle communication network may be used for communications between devices represented as the vehicle computer 210 in this disclosure. Further, as mentioned below, various controllers and/or sensors 215 may provide data to the vehicle computer 210 via the vehicle communication network.

The vehicle computer 210 in the vehicle 205 receives data from the sensors 215. Vehicle 205 sensors 215 may include a variety of devices such as are known to provide data to the vehicle computer 210. For example, the sensors 215 may include Light Detection And Ranging (LIDAR) sensor(s) 215, etc., disposed on a top of the vehicle 205, behind a vehicle 205 front windshield, around the vehicle 205, etc., that provide relative locations, sizes, and shapes of objects surrounding the vehicle 205. As another example, one or more radar sensors 215 fixed to vehicle 205 bumpers may provide data to provide locations of the objects, second vehicles, etc., relative to the location of the vehicle 205. The sensors 215 may further alternatively or additionally, for example, include camera sensor(s) 215 (e.g. front view, side view, etc.) providing images from an area surrounding the vehicle 205. In the context of this disclosure, an object is a physical (i.e., material) item that has mass and that can be represented by physical phenomena (e.g., light or other electromagnetic waves, or sound, etc.) detectable by sensors 215. Thus, the vehicle 205, as well as other items including as discussed below, fall within the definition of "object" herein.

The vehicle computer 210 is programmed to receive data from one or more sensors 215 substantially continuously, periodically, and/or when instructed by a remote server computer 140, etc. The data may, for example, include a location of the vehicle 205. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 205. As one example, the data may be image data of the environment around the vehicle 205. In such an example, the image data may include one or more objects and/or markings (e.g., lane markings) on or along a road. Image data herein means digital image data (e.g., comprising pixels with intensity and color values) that can be acquired by camera sensors 215. The sensors 215 can be mounted to any suitable location in or on the vehicle 205 (e.g., on a vehicle 205 bumper, on a top of a vehicle 205, etc.) to collect images of the environment around the vehicle 205.

The vehicle 205 actuators 220 are implemented via circuits, chips, or other electronic and or mechanical components that can actuate various vehicle subsystems in accordance with appropriate control signals as is known. The actuators 220 may be used to control components 225, including propulsion and steering of a vehicle 205.

In the context of the present disclosure, a vehicle component 225 is one or more hardware components adapted to perform a mechanical or electro-mechanical function or operation—such as moving the vehicle 205, slowing or stopping the vehicle 205, steering the vehicle 205, etc. Non-limiting examples of components 225 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 210 may be configured for communicating via a vehicle-to-vehicle communication module 230 or interface with devices outside of the vehicle 205 (e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications)). The communications module 230 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 230 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 230 according to any suitable short-range communications mechanism (e.g., DSRC, cellular, or the like).

The vehicle computer 210 may be programmed to receive the verified motion planning operations and the verified motion control operations from the remote server computer 140 and/or the computer 110,112 (e.g., via the network 135). The vehicle computer 210 may then store the verified motion planning operations and the verified motion control operations (e.g., in a memory of the vehicle computer 210). The vehicle computer 210 may operate the vehicle 205 based on the verified motion planning operations and the verified motion control operations. For example, the vehicle computer 210 can provide sensor 215 data describing respective vehicle states and an environment around the vehicle 205 as input to the motion planning operation that outputs a trajectory for the vehicle 205. The vehicle computer 210 can then provide the trajectory to the motion control operations that outputs control parameters to operate the vehicle 205 according to the trajectory. The vehicle computer 210 can actuate one or more vehicle components 225 according to the output control parameters. The vehicle computer 210 can periodically update the trajectory according to known techniques, e.g., open-loop planning.

During operation, the vehicle computer 210 can determine whether the output of the motion planning operations are verified. That is, the vehicle computer 210 can compare the respective vehicle states at respective points of the trajectory to the state constraints, as discussed above. For example, the vehicle computer 210 can determine whether a lateral acceleration of the vehicle 205 is within the range or pair of values defining a lateral acceleration constraint. Additionally, or alternatively, the vehicle computer 210 can compare the trajectory to a trajectory constraint, as discussed above. For example, the vehicle computer 210 can determine whether the trajectory is within a difference parameter (e.g., a specified distance) of an object. If the vehicle computer 210 determines that the output of the motion planning operations is verified, then the vehicle computer 210 can continue to perform motion planning operations. If the vehicle computer 210 determines that the output of the motion planning operations is unverified, then the vehicle computer 210 can stop performing motion planning operations. In this situation, the vehicle computer 210 may be programmed to operate the vehicle 205 in a non-autonomous mode (i.e., a user controls braking, steering, and propulsion of the vehicle 205).

During operation of the vehicle 205, the vehicle computer 210 can determine whether the output of the motion control operations are verified. That is, the vehicle computer 210 can compare respective actual vehicle states at respective points of the trajectory to the respective expected states (discussed above) at the respective points of the trajectory. For example, the vehicle computer 210 can determine the respective actual vehicle states based on sensor 215 data, as discussed above. The vehicle computer 210 can then compare respective differences between the respective actual vehicle states and the respective expected vehicle states to the respective difference parameters for the respective vehicle states. If each of the respective differences is less than the respective difference parameters, then the vehicle computer 210 can determined that the output of the motion control operations is verified. If at least one of the respective differences is greater than or equal to the at least one respective difference parameter, then the vehicle computer 210 can determine that the output of the motion control operations is unverified. If the vehicle computer 210 determines that the output of the motion control operations is verified, then the vehicle computer 210 can continue to perform motion control operations. If the vehicle computer 210 determines that the output of the motion control operations is unverified, then the vehicle computer 210 can stop performing motion control operations. In this situation, the vehicle computer 210 may be programmed to operate the vehicle 205 in the non-autonomous mode.

Figure 3:
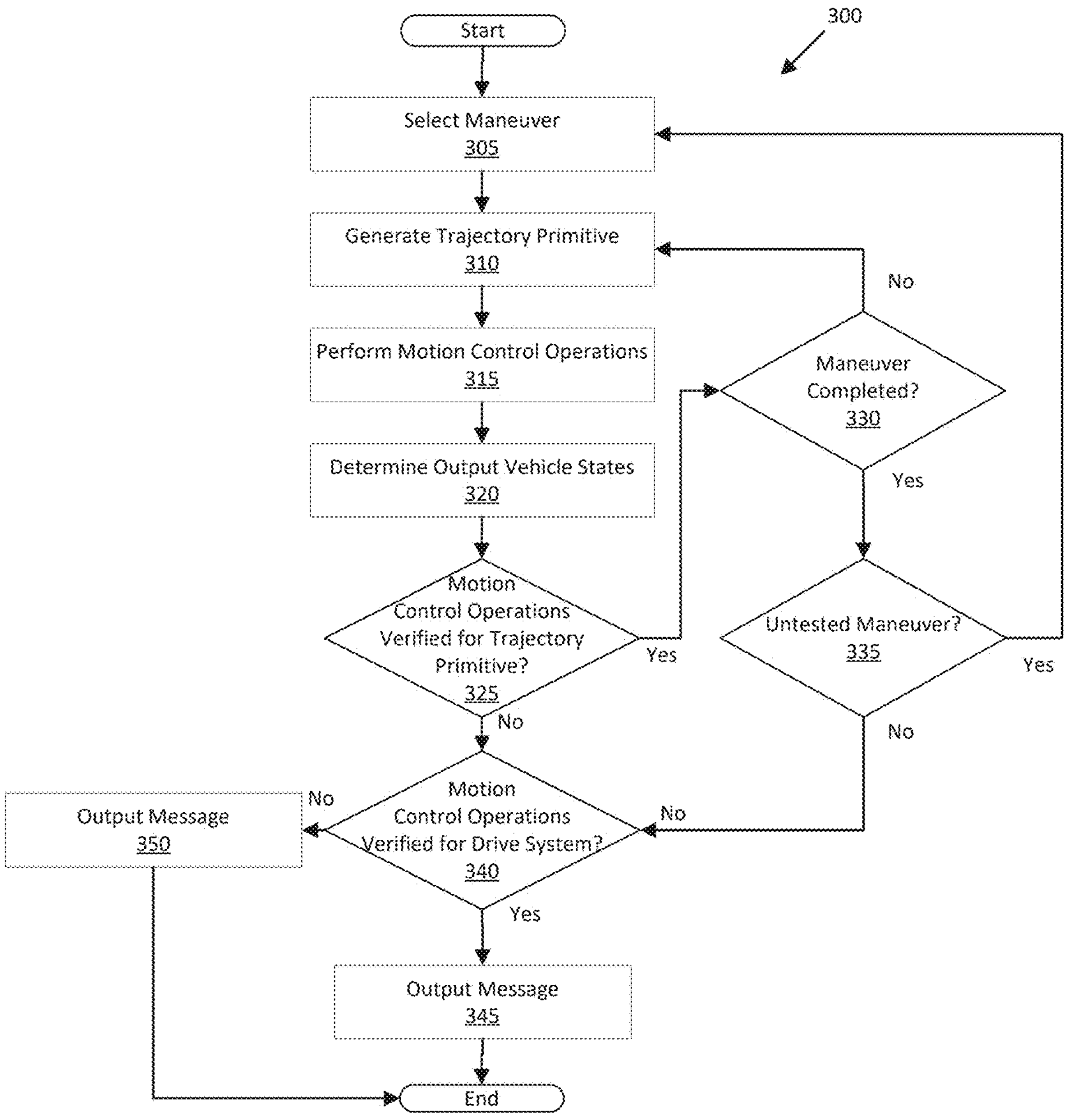
FIG. 3 an example flowchart of an example process for performing motion control operations via the example simulation system.

FIG. 3 is a diagram of an example process 300 for performing motion control operations of a vehicle driving system. The process 300 begins in a block 305. The process 300 can be carried out by a first computer 110 included in a simulation system 100 executing program instructions stored in a memory thereof.

In the block 305, the first computer 110 selects a maneuver. As discussed above, the first computer 110 can access a database that stores a plurality of maneuvers to select one maneuver that is indicated as warranting simulation. The first computer 110 can transform a trajectory defined by the maneuver from a global coordinate system to a vehicle coordinate system, as discussed above. The process 300 continues in a block 310.

In the block 310, the first computer 110 generates a trajectory based on the transformed trajectory, as discussed above. The first computer 110 can generate updated trajectories that may be concatenated to a previous trajectory to achieve the transformed trajectory, as discussed above. The process 300 continues in a block 315.

In the block 315, the first computer 110 performs motion control operations for the trajectory. For example, the motion control operations can input the respective expected vehicle states for the trajectory into a motion control algorithm, as discussed above. The motion control algorithm can output control parameters, as discussed above. The process 300 continues in a block 320.

In the block 320, the first computer 110 determines respective output vehicle states. For example, the first computer 110 can actuate a physical vehicle (and/or components thereof) based on the control parameters output in the block 315. In such an example, the first computer 110 can determine the respective output vehicle states based on sensor 115 data, as discussed above. As another example, the first computer 110 can input the control parameters output in the block 315 to a vehicle dynamics model (as discussed above), which can output the respective output vehicle states. The process 300 continues in a block 325.

In the block 325, the first computer 110 determines whether motion control operations are verified for the trajectory. The first computer 110 can, for example, compare the respective output vehicle states with the respective expected vehicle states of the trajectory. If the respective output vehicle states are within respective difference parameters of the respective vehicle states, then the first computer 110 determines that the motion control operations are verified for the trajectory. If the motion control operations are verified for the respective trajectories, then the process 300 continues in a block 330. If at least one respective output vehicle states is outside of the at least one respective difference parameter, then the process 300 continues in a block 340.

In the block 330, the first computer 110 determines whether the maneuver is complete. That is, the first computer 110 determines whether the vehicle (or virtual vehicle) has reached a terminal point of the trajectory defined by the maneuver. If the maneuver is not complete, then the process 300 returns to the block 310. If the maneuver is complete, then the first computer 110 can update the database to indicate that the maneuver has been simulated. In this situation, the process 300 continues in a block 335.

In the block 335, the first computer 110 determines whether at least one maneuver is warrants simulation. For example, the first computer 110 can access the database to determine whether each maneuver has been simulated. If the first computer 110 determines that at least one maneuver is indicated as warranting simulation in the database, then the process 300 returns to the block 305. If the first computer 110 determines that all maneuvers are indicated as being simulated in the database, then the process 300 continues in the block 340.

In the block 340, the first computer 110 determines whether motion control operations for the vehicle driving system are verified. If the motion control operations for each trajectory of the respective maneuvers is verified, then the first computer 110 determines that the motion control operations of the vehicle driving system are verified. If the motion control operations for at least one trajectory of the respective maneuvers is unverified, then the first computer 110 determines that the motion control operations of the vehicle driving system are unverified. If the motion control operations for the vehicle driving system are verified, then the process 300 continues in a block 345. Otherwise, the process 300 continues in a block 350.

In the block 345, the first computer 110 may provide a message (e.g., via the network 135) to the remote server computer 140 and/or a vehicle computer 210 indicating that the motion control operations of the vehicle driving system are verified, as discussed above. Additionally, or alternatively, the first computer 110 may provide the motion control operations to the remote server computer 140 and/or the vehicle computer 210 (e.g., via the network 135), as discussed above. The process 300 ends following the block 345.

In the block 350, the first computer 110 may provide a message (e.g., via the network 135) to the remote server computer 140 and/or the vehicle computer 210 indicating that the motion control operations of the vehicle driving system are unverified. Additionally, the message may specify the maneuver(s) in which the motion control operations were not verified. The process 300 ends following the block 350.

Figure 4:
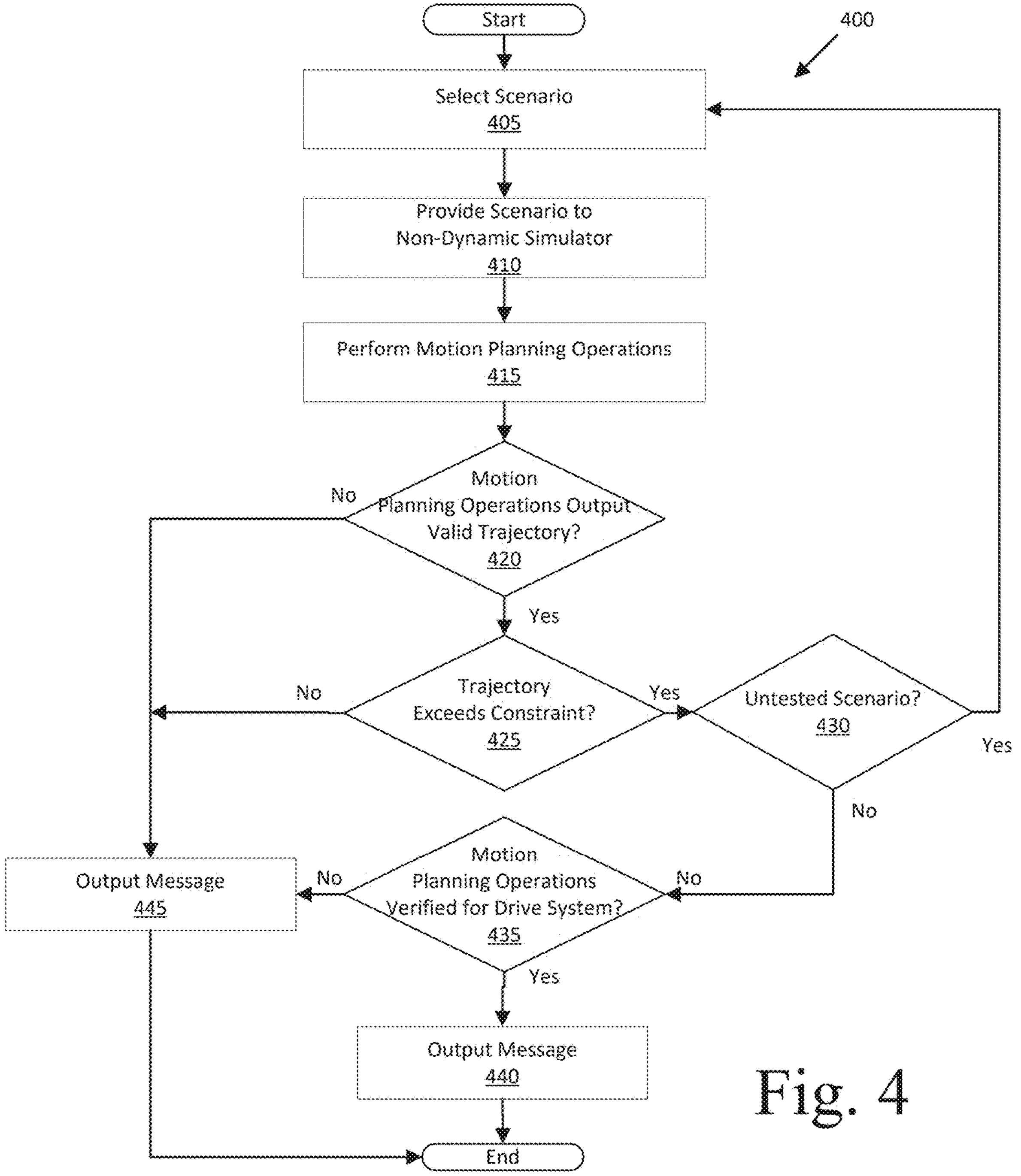
FIG. 4 is an example flowchart of an example process for performing motion planning operations via the example simulation system.

FIG. 4 is a diagram of an example process 400 for performing motion planning operations of a vehicle driving system. The process 400 begins in a block 405. The process 400 can be carried out by a first computer 110 (or a second computer 112) included in a simulation system 100 executing program instructions stored in a memory thereof. The process 400 may be carried out independently of the process 300. For example, the process 400 can be carried out prior to or after the process 300. As another example, the first computer 110 can carry out the process 300 and the second computer 112 can carry out the process 400 simultaneously.

In the block 405, the computer 110, 112 selects a scenario. To select the scenario, the computer 110, 112 can access a database that stores a plurality of scenarios to select one scenario that is indicated as warranting simulation. The scenario may further include a trajectory constraint, as discussed above. The process 400 continues in a block 410.

In the block 410, the computer 110, 112 provides the scenario to a non-dynamic simulator. The non-dynamic simulator transforms the information included in the scenario from the global coordinate system to the vehicle coordinate system, as discussed above. The process 400 continues in a block 415.

In the block 415, the computer 110, 112 performs motion planning operations for the transformed information, as discussed above. The trajectory output from the motion planning operations may, for example, include respective generated vehicle states at the respective points included in the transformed scenario, as discussed above. The process 400 continues in a block 420.

In the block 420, the computer 110, 112 determines whether the motion planning operations output a valid trajectory for the scenario. The computer 110, 112 can compare the respective generated vehicle states at the respective points of the trajectory to respective state constraints (as discussed above). If at least one of the generated vehicle states of the respective points is outside of the respective state constraint, then the computer 110, 112 determines that the output is an invalid trajectory. If the respective generated vehicle states of each of the respective points are within the respective state constraints, then the computer 110, 112 determines that the output is a valid trajectory. In this situation, the computer 110, 112 can update the database to indicate that the scenario has been simulated. If the output is a valid trajectory, then the process 400 continues in a block 425. Otherwise, the process 400 continues in a block 440.

In the block 425, the computer 110, 112 determines whether the valid trajectory exceeds a trajectory constraint of the scenario. For example, the computer 110, 112 can compare the respective generated vehicle states to the trajectory constraint given the difference parameters of the respective vehicle states, as discussed above. As another example, the process 400 can return to the block 415 to perform motion planning operations based on a bias. In this situation, the bias (e.g., a respective value defining the range of a respective state constraint) may be input into the motion planning operations. The computer 110, 112 can then compare the respective generated vehicle states output by the motion planning operations to the trajectory constraint, as discussed above. If the valid trajectory exceeds the trajectory constraint, then the process 400 continues in the block 445. Otherwise, the process 400 continues in a block 430.

In the block 430, the computer 110, 112 determines whether at least one scenario warrants simulation. For example, the computer 110, 112 can access the database to determine whether each scenario has been simulated. If the computer 110, 112 determines that at least scenario is indicated as warranting simulation in the database, then the process 400 returns to the block 405. If the computer 110, 112 determines that all scenarios are indicated as being simulated in the database), then the process 400 continues in the block 435.

In the block 435, the computer 110, 112 determines whether motion planning operations for the vehicle driving system are verified. If the motion planning operations for each of the scenarios is verified, then the computer 110, 112 determines that the motion planning operations of the vehicle driving system are verified. If the motion planning operations for at least one of the scenarios is unverified, then the computer 110, 112 determines that the motion planning operations of the vehicle driving system are unverified. If the motion planning operations for the vehicle driving system are verified, then the process 400 continues in a block 440. Otherwise, the process 400 continues in a block 445.

In the block 440, the computer 110, 112 may provide a message (e.g., via the network 135) to the remote server computer 140 and/or the vehicle computer 210 indicating that the motion planning operations of the vehicle driving system are verified, as discussed above. Additionally, or alternatively, the computer 110, 112 may provide the motion planning operations to the remote server computer 140 and/or the vehicle computer 210 (e.g., via the network 135), as discussed above. The process 400 ends following the block 440.

In the block 445, the computer 110, 112 may provide a message (e.g., via the network 135) to the remote server computer 140 and/or the vehicle computer 210 indicating that the motion planning operations of the vehicle driving system are unverified. Additionally, the message may specify the scenario(s) in which the motion planning operations were not verified. The process 400 ends following the block 445.

Figure 5:
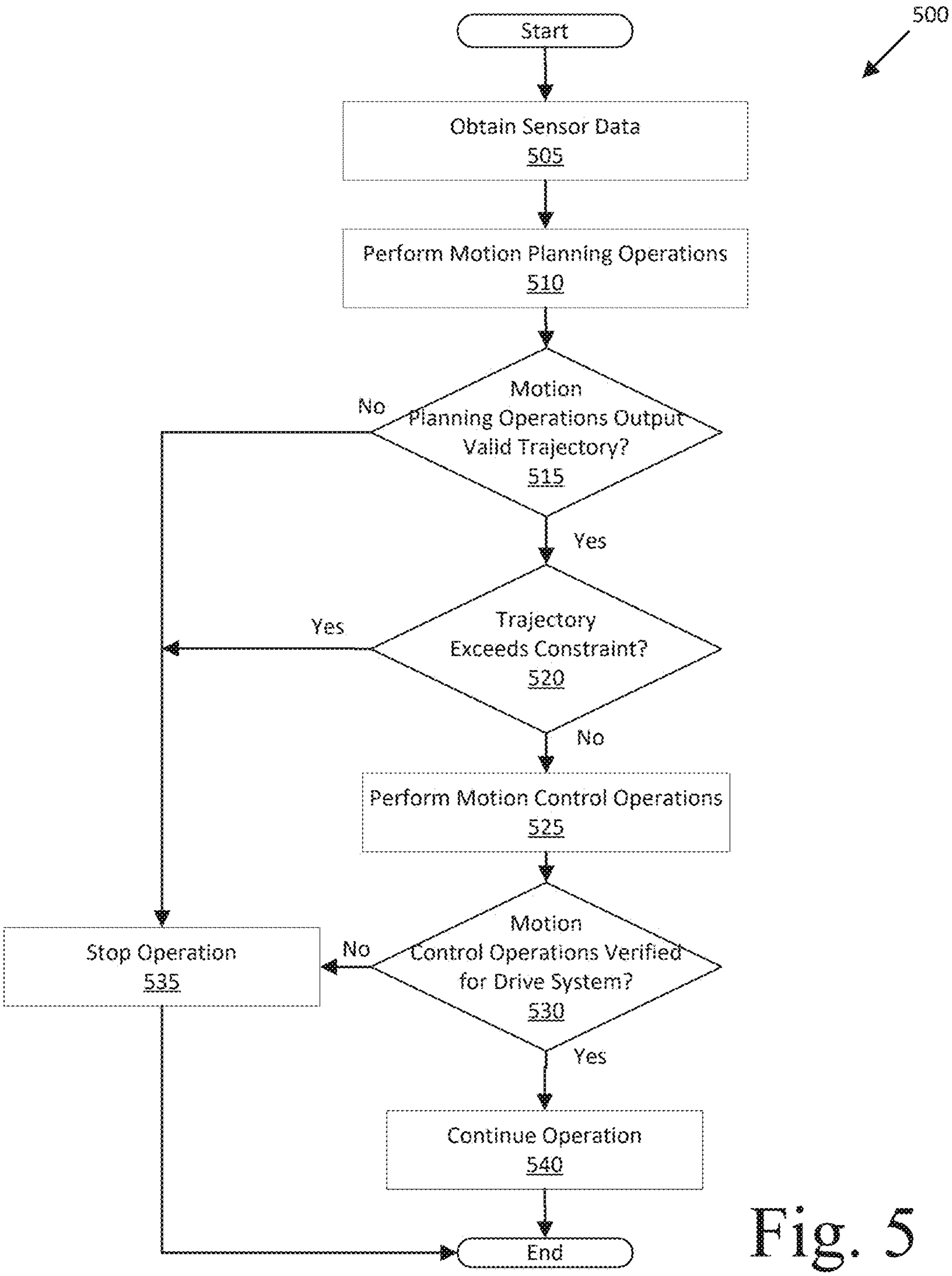
FIG. 5 is an example flowchart of an example process for performing motion control operations and motion planning operations on a vehicle.

FIG. 5 is a diagram of an example process 500 for performing motion control operations and motion planning operations in a vehicle 205. The process 500 begins in a block 505. The process 500 can be carried out by a vehicle computer 210 included in the vehicle 205 executing program instructions stored in a memory thereof.

In a block 505, the vehicle computer 210 obtains sensor 215 data describing respective vehicle states and an environment around the vehicle 205. The process 500 continues in a block 510.

In the block 510, the vehicle computer 210 performs motion planning operations based on the sensor 215 data obtained in the block 510. The motion planning operations output a generated trajectory for the vehicle 205. The process 500 continues in a block 515.

In the block 515, the vehicle computer 210 determines whether the generated trajectory is a valid trajectory. The vehicle computer 210 can compare respective generated vehicle states at respective points along the generated trajectory to respective state constraints, as discussed above. If each of the respective generated vehicle states is within the respective state constraints, then the vehicle computer 210 determines that the generated trajectory is valid. In this situation, the process 500 continues in a block 520. Otherwise, the process 500 continues in a block 540.

In the block 520, the vehicle computer 210 determines whether the valid trajectory exceeds a trajectory constraint. The vehicle computer 210 can compare the respective generated vehicle states to the trajectory constraint, as discussed above. If the valid trajectory exceeds the trajectory constraint, then the process continues in the block 535. Otherwise, the process continues in a block 525.

In the block 525, the vehicle computer 210 performs motion control operations based on the generated trajectory, as discussed above. The process 500 continues in a block 530.

In the block 530, the vehicle computer 210 determines whether the output of the motion control operations is verified. For example the vehicle computer 210 can determine respective actual vehicle states based on sensor 215 data, as discussed above. The vehicle computer 210 can then compare the respective actual vehicle states to the respective generated vehicle states, as discussed above. If respective differences between the respective actual vehicle states and the respective generated vehicle states are each less than respective difference parameters, then the vehicle computer 210 determines that the output of the motion control operations is verified. If at least one respective difference is greater than or equal to the at least one respective difference parameters, then the vehicle computer 210 determines that the output of the motion control operations is unverified. If the output of the motion control operations is verified, then the process 500 continues in the block 540. Otherwise, the process 500 continues in the block 535.

In the block 535, the vehicle computer 210 stops operating the vehicle 205 based on the motion control operations and/or the motion planning operations. The vehicle computer 210 may transition the vehicle 205 to a driving mode that receives user input to control braking, propulsion, and/or steering of the vehicle 205. The process 500 ends following the block 535.

In the block 540, the vehicle computer 210 continues to operate the vehicle 205 based on the motion control operations and the motion planning operations. The process 500 may end following the block 540. Alternatively, the process 500 may return to the block 505 (e.g., while the vehicle 205 remains in an ON state).

Systems and methods described herein may be modified and/or omitted depending on the context, situation, and applicable rules and regulations. Further, regardless actions that may be taken by a vehicle such as a computer controlling vehicle speed and/or acceleration, users should use good judgement and common sense when operating the vehicle. Operations described herein should always be implemented and/or performed in accordance with the owner manual and safety guidelines.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a first computer including a processor and a memory, the memory storing instructions executable by the processor to:

based on respective maneuvers, generate respective trajectories according to respective vehicle states;

perform respective motion control operations of a vehicle driving system along the respective trajectories, wherein the respective motion control operations are performed in a non-dynamic simulator that transforms respective scenarios for the maneuvers from a global coordinate system to a vehicle coordinate system;

determine, for each of the motion control operations along the respective trajectories, whether output of the motion control operations is within a difference parameter, wherein the difference parameter specifies a permitted deviation from one of the respective vehicle states included in the respective trajectory; and upon determining, for each of the motion control operations along the respective trajectories, that the output of the motion control operations is within the difference parameter, provide the motion control operations via a wide area network to a second computer that is in a vehicle, the first computer being remote from the vehicle.

2. The system of claim 1, wherein the instructions further include instructions to:

perform respective motion planning operations of the vehicle driving system based on the respective scenarios, wherein each scenario specifies objects in an environment and points through which vehicle operation is planned; and determine, for each of the motion planning operations, whether output of the motion planning operations is a generated trajectory according to the respective vehicle states.

3. The system of claim 2, wherein the instructions further include instructions to determine, for each of the motion planning operations, whether the generated trajectories exceed a trajectory constraint based on the difference parameter.

4. The system of claim 3, wherein the instructions further include instructions to, upon determining, for each of the motion planning operations, that the output of the motion planning operations is the generated trajectory according to the respective vehicle states and the generated trajectories do not exceed the trajectory constraint, provide the motion planning operations to the second computer.

5. The system of claim 4, further comprising the second computer, including a second processor and a second memory storing instructions executable by the second processor such that the second-computer is programmed to:

while the output of the motion planning operations is the generated trajectory according to the respective vehicle states and the generated trajectories do not exceed the trajectory constraint, operate the vehicle based on the motion planning operations.

6. The system of claim 1, further comprising the second computer, including a second processor and a second memory storing instructions executable by the second processor such that the second computer is programmed to:

while the output of the motion control operations is within the difference parameter, operate a vehicle based on the motion control operations.

7. A system, comprising:

a first computer remote from a vehicle and including a processor and a memory, the memory storing instructions executable by the processor such that the first computer is programmed to:

based on respective maneuvers, generate respective trajectories according to respective vehicle states;

perform respective motion control operations of a vehicle driving system along the respective trajectories; and determine, for each of the motion control operations along the respective trajectories, whether output of the motion control operations is within a difference parameter, wherein the difference parameter specifies a permitted deviation from one of the respective vehicle states included in the respective trajectory; and a second computer remote from the vehicle, including a second processor and a second memory storing instructions executable by the second processor such that the second computer is programmed to:

perform respective motion planning operations of the vehicle driving system based on respective scenarios, wherein the scenario specifies objects in an environment and points through which vehicle operation is planned; and determine, for each of the motion planning operations, whether output of the motion planning operations is a generated trajectory according to the respective vehicle states.

8. The system of claim 7, wherein the second computer is further programmed to determine, for each of the motion planning operations, whether the generated trajectories exceed a trajectory constraint based on the difference parameter.

9. The system of claim 8, wherein the second computer is further programmed to, upon determining, for each of the motion planning operations, that the output of the motion planning operations is the generated trajectory according to the respective vehicle states and the generated trajectories do not exceed the trajectory constraint, provide the motion planning operations to a vehicle computer.

10. The system of claim 9, further comprising the vehicle computer, including a third processor and a third memory storing instructions executable by the third processor such that the vehicle computer is programmed to:

while the output of the motion planning operations is the generated trajectory according to the respective vehicle states and the generated trajectories do not exceed the trajectory constraint, operate a vehicle based on the motion planning operations.

11. The system of claim 7, wherein the first computer is further programmed to, upon determining, for each of the motion control operations along the respective trajectories, that the output of the motion control operations is within the difference parameter, provide the motion control operations to a vehicle computer.

12. The system of claim 11, further comprising the vehicle computer, including a third processor and a third memory storing instructions executable by the third processor such that the vehicle computer is programmed to:

while the output of the motion control operations is within the difference parameter, operate a vehicle based on the motion control operations.

13. A method comprising:

based on respective maneuvers, generating respective trajectories according to respective vehicle states;

performing respective motion control operations of a vehicle driving system along the respective trajectories, wherein the respective motion control operations are performed in a non-dynamic simulator that transforms respective scenarios for the maneuvers from a global coordinate system to a vehicle coordinate system;

determining, for each of the motion control operations along the respective trajectories, whether output of the motion control operations is within a difference parameter, wherein the difference parameter specifies a permitted deviation from one of the respective vehicle states included in the respective trajectory; and upon determining, for each of the motion control operations along the respective trajectories, that the output of the motion control operations is within the difference parameter, providing the motion control operations via a wide area network to a second computer that is in a vehicle, the first computer being remote from the vehicle.

14. The method of claim 13, further comprising:

performing respective motion planning operations of the vehicle driving system based on the respective scenarios, wherein each scenario specifies objects in an environment and points through which vehicle operation is planned; and determining, for each of the motion planning operations, whether output of the motion planning operations is a generated trajectory according to the respective vehicle states.

15. The method of claim 14, further comprising determining, for each of the motion planning operations, whether the generated trajectories exceed a trajectory constraint based on the difference parameter.

16. The method of claim 15, further comprising upon determining, for each of the motion planning operations, that the output of the motion planning operations is the generated trajectory according to the respective vehicle states and the generated trajectories do not exceed the trajectory constraint, providing the motion planning operations to the second computer.

17. The method of claim 13, further comprising, while the output of the motion control operations is within the difference parameter, operating, via the second computer, the vehicle based on the motion control operations.

* * * * *